Patented Jan. 22, 1946

2,393,562

UNITED STATES PATENT OFFICE 2,393,562

BEVERAGE CONCENTRATES AND METHODS OF PREPARING SAME

Ramon Perech, New York, N. Y.

No Drawing. Application January 7, 1944, Serial No. 517,434

10 Claims. (Cl. 99—71)

The present invention relates to the preparation of concentrates made from infusions or extracts of medicinal plants such as teas of various types, coffee, coffee substitutes and the like. Concentrates prepared according to the invention are designed for use primarily but not exclusively in making beverages which have the flavor and aroma and also the vitamin content and therapeutic effects of beverages made directly from the leaves, fruit, bark or roots of the medicinal plants.

The invention aims to provide improved beverage concentrates soluble in water and of small weight and bulk as compared with the weight and as compared with the bulk of the raw materials.

Another object is to provide an improved method of preparing such concentrates whereby the flavor and aroma as well as the vitamin content and therapeutic effects of the material treated are preserved in the concentrates and reproduced in the beverages.

The invention has been developed more particularly in the preparation of dry concentrates of tea and coffee by extracting the desired ingredients from the raw materials with suitable solvents and later eliminating the solvents. For convenience of disclosure illustrating the principles such an embodiment will herein be more particularly described. In accordance with the invention it has been found that the process and the concentrates are improved by the addition of a suitable cellulose compound to the material during preparation of the concentrates, the addition being made in such manner and at such time that the cellulose will be retained in the product. The proportion of cellulose added may vary considerably with the material extracted and the degree of dilution of the extract. Ordinarily the weight of the cellulose compound added should be of the order of 1% of the extract before concentration begins. Probably the best practice would require between ¼% and 3% of the cellulose but experiments should be made with each particular material to determine the optimum percentage of cellulose.

According to the present invention salts of carboxy-methyl-cellulose (also sometimes referred to erroneously as cellulose-glycolate), such as the sodium, potassium, ammonium, etc., salts have been found to be decidedly superior to other cellulose compounds for use as an addition agent. Of these compounds the sodium salt is preferred. It is water soluble and stable in hot and cold water within the range of temperatures found effective for dehydration of extracts and infusions. This compound has been described in Germany as of the formula $C_6H_6O_4O.CH_2COONa$. In this country the Hercules Powder Company at my request produced samples of sodium-carboxy-methyl-cellulose and this material has been used successfully by me in producing a number of concentrates in accordance with this invention. This compound has been marketed abroad as "Cellofas WFZ" and also as "Sodium-cellulose-glycolate."

The cellulose compound should be added well before the dehydration treatment is completed and while the product is still to a substantial degree liquid.

The sodium-carboxy-methyl-cellulose is inert physiologically and is not objectionable in the beverage produced with the concentrates herein described. In the beverage it becomes an inseparable homogenized component.

The method of preparation of concentrates according to the invention involves preparation of an extract or infusion in a solvent by any suitable method, addition of sodium-carboxy-methyl-cellulose and removal of the solvent used by such method as will carry off as little as possible of the desired constituents.

An effective method of removing the solvent involves evaporation under high vacuum to remove the major portion of the solvent followed by drum drying or spray drying when a powdered concentrate is desired.

*Example*

One pound of fine-ground roasted coffee is treated in a silex coffee-making apparatus to produce the usual strong coffee extract. To this extract is added twenty-five grams of sodium-carboxy-methyl-cellulose. The extract is then evaporated at 29 inches mercury vacuum in a Pfaudler glass-lined evaporator to remove 80% of the water. The concentrated extract is then dried on a stainless steel drum drier, preferably in vacuum. A substantially non-hygroscopic concentrate having the aroma and flavor as well as the medicinal effect of the original coffee is obtained. Instead of the drum dryer spray drying may be used if preferred.

Tea and products of other beverage plants may be similarly treated to provide corresponding extracts.

The foregoing particular description of selected embodiments of the invention is illustrative merely and is not to be construed as defining the limits of the invention.

I claim:

1. A readily dispersible concentrate of a medicinal plant extract including in substantial amount a water-soluble carboxymethyl cellulose compound.

2. A readily dispersible dried extract containing as its principal ingredients evaporated medicinal plant extract and a water-soluble salt of carboxymethyl cellulose.

3. A readily dispersible non-deliquescent powdered extract containing as its principal ingredients evaporated medicinal plant solids and water-insoluble sodium carboxymethyl cellulose.

4. A coffee extract concentrate capable of forming when combined with water a palatable drink having the flavor of the original coffee extract comprising as its principal ingredients evaporated coffee extract and water-soluble sodium carboxymethyl cellulose.

5. A method of preparing a concentrate of a medicinal plant extract which comprises dehydrating such extract to remove a large proportion of the water, adding to the dehydrated extract a water-soluble salt of carboxymethyl cellulose, and further dehydrating the mixture to substantial dryness.

6. The method of preparing a concentrate of coffee extract which comprises adding a water-soluble salt of carboxymethyl cellulose to the extract and evaporating water from the extract.

7. The method of preparing a concentrate of coffee extract which comprises adding at least about .25% of sodium carboxymethyl cellulose to said extract and evaporating water from said extract.

8. A tea extract concentrate capable of forming when combined with water a palatable drink having the flavor of the original tea extract comprising as its principal ingredients evaporated tea extract and water-soluble sodium carboxymethyl cellulose.

9. The method of preparing a concentrate of tea extract which comprises adding a water-soluble salt of carboxymethyl cellulose to the extract and evaporating water from the extract.

10. The method of preparing a concentrate of tea extract which comprises adding at least about .25% of sodium carboxymethyl cellulose to said extract and evaporating water from said extract.

RAMON PERECH.